United States Patent
Kuhlman et al.

(10) Patent No.: US 7,363,492 B2
(45) Date of Patent: Apr. 22, 2008

(54) METHOD FOR ZERO-KNOWLEDGE AUTHENTICATION OF A PROVER BY A VERIFIER PROVIDING A USER-SELECTABLE CONFIDENCE LEVEL AND ASSOCIATED APPLICATION DEVICES

(75) Inventors: Douglas A. Kuhlman, Inverness, IL (US); Ezzat A. Dabbish, Cary, IL (US); Larry C. Puhl, Huntley, IL (US)

(73) Assignee: Motorola, Inc., Schaumburg, IL (US)

( * ) Notice: Subject to any disclaimer, the term of this patent is extended or adjusted under 35 U.S.C. 154(b) by 83 days.

(21) Appl. No.: 11/066,639

(22) Filed: Feb. 25, 2005

(65) Prior Publication Data

US 2006/0195692 A1 Aug. 31, 2006

(51) Int. Cl.
*H04L 29/00* (2006.01)

(52) U.S. Cl. .................. 713/166; 713/155; 713/156; 713/168; 713/175; 713/176; 726/4; 726/5; 726/12; 726/14

(58) Field of Classification Search ............... 713/155, 713/161, 168, 169, 170, 171, 156, 175, 176, 713/166; 380/232, 30; 726/2–5, 39, 12, 726/14

See application file for complete search history.

(56) References Cited

U.S. PATENT DOCUMENTS

| | | | |
|---|---|---|---|
| 5,581,615 A | | 12/1996 | Stern |
| 6,301,664 B1 * | | 10/2001 | Di-Crescenzo et al. ..... 713/189 |
| 6,332,192 B1 * | | 12/2001 | Boroditsky et al. ......... 713/168 |
| 6,369,904 B1 * | | 4/2002 | Bhattacharjya et al. .... 358/1.14 |
| 6,456,393 B1 * | | 9/2002 | Bhattacharjya et al. ...... 358/1.9 |
| 6,651,167 B1 | | 11/2003 | Terao et al. |
| 7,010,682 B2 * | | 3/2006 | Reinold et al. ............. 713/155 |
| 7,035,404 B2 * | | 4/2006 | Furukawa .................... 380/28 |
| 7,047,408 B1 * | | 5/2006 | Boyko et al. ............... 713/169 |
| 7,073,068 B2 * | | 7/2006 | Jakobsson et al. .......... 713/184 |
| 2005/0220298 A1 * | | 10/2005 | Girault et al. ................ 380/30 |
| 2005/0283198 A1 * | | 12/2005 | Haubrich et al. ............. 607/30 |

FOREIGN PATENT DOCUMENTS

EP 1301006 A1 4/2003

OTHER PUBLICATIONS

Goldwasser et al., "The Knowledge Complexity of Interactive Proof-Systems", ACM, 0-89791-151-2/85/005/0291, pp. 291-304, 1985.*

(Continued)

*Primary Examiner*—Kambiz Zand
*Assistant Examiner*—Tongoc Tran (57) ABSTRACT

Authentication is performed to a confidence level (CL) desired by a verifier (220). A prover (210) picks and sends certain same size, square matrices to the verifier (220). A random request bit is sent (234) from the verifier (220) to the prover (210) after the receipt of a certain square matrix. Depending on the request bit, calculations are made (244, 264) by the verifier (220) to determine if the matrices sent from the prover are verifiable. The prover (210) is iteratively authenticated by the verifier (220). Iterations are continued until (320) a count of the iterations (IL) reaches a number sufficient to achieve the desired confidence level (CL). After a delay, more iterations can achieve a higher confidence level by building on previous result of authentication without having to begin at zero. During this delay, the verifier (220) can perform tasks in reliance on the result of authentication. Digital logic can perform the authentication.

28 Claims, 5 Drawing Sheets

OTHER PUBLICATIONS

Oded Goldreich, "Zero-Knowledge Twenty Years After Its Invention", http://www.wisdom.weizmann.ac.il/~oded/zk-tut02.html, pp. 1-32, Oct. 27, 2002.*

J.-J Quisquater and L. Guillou, "How to Explain Zero-Knowledge Protocols to Your Children" Advances in Cryptology—CRYPTO 1989, Lecture Notes in Computer Science 435, Springer-Verlag (1990) pp. 628-631.

* cited by examiner

METHOD FOR ZERO-KNOWLEDGE AUTHENTICATION OF A PROVER BY A VERIFIER PROVIDING A USER-SELECTABLE CONFIDENCE LEVEL AND ASSOCIATED APPLICATION DEVICES

BACKGROUND OF THE INVENTIONS

1. Technical Field

The present inventions relate to authentication and, more particularly, relate to authentication performed iteratively.

2. Description of the Related Art

Authentication is typically performed by means of a signature. Even in interactive protocols a random nonce is signed as part of the authentication step. Current authentication mechanisms between devices are almost exclusively based on RSA (Rivest, Shamir, Adleman), DSA (Digital Signature Algorithm), or ECC (Elliptic Curve Cryptography). Specifications for all of these can be found in Bruce Schneier's book *Applied Cryptography: Protocols, Algorithms, and Source Code in C*.

OpenSSH (SSH meaning Secure SHell) has various security levels. No security is self-explanatory. Minimal security is password authentication. Medium is public-key based (like RSA or ECC). High security uses Kerberos, a public-key combined with password scheme, but there is no way of switching between them, short of completely renegotiating the entire protocol.

A first problem inherent in existing schemes is that levels of authentication (and therefore trust) are fixed and non-interactive. The concept of different levels of authentication is known, but in existing systems, the only way to pass from one level of authentication to a higher level is to completely redo the entire authentication scheme from scratch, discarding any partial trust from an earlier authentication effort. This is wasteful of processing resources and suboptimal.

A second problem is that authentication, as it currently exists, is an all-or-nothing proposition, especially between devices. For many applications, it is important to get some level of trust quickly, but high trust can wait longer, as slow processors work to prove their authenticity over days or even weeks. This is applicable to different kinds of low-power devices. An example of this is RF neurons such as the neuRFon™ brand RF neurons under development by Motorola, Inc. of Schaumburg, Ill., USA.

A third problem is that current schemes for device authentication are essentially fixed at a certain level of authentication, that is, the level of trust. For many applications, however, the trust required of different devices is different—in an automobile, for example, it is much more important that the master cylinder be genuine than that the turn signal is genuine.

One of the many limitations of the current model is the lack of ability to scale between different levels of authentication. In many applications, a very high level of authentication is not needed for all nodes in a network. Similarly, a change in circumstances occasionally requires a change from a lower level of authentication to a higher level. In current implementations, this can only be accomplished by completely discarding the early authentication and starting afresh, wasting cycles and bandwidth.

SUMMARY OF THE INVENTIONS

An object of the present inventions is to provide a method of scalable authentication having iterative characteristics;

Another object of the present inventions is to provide an authentication technique allowing a second authentication with a higher confidence level by building on a previous result of authentication without starting over at zero;

Another further object of the present inventions is to provide an authentication technique having a selectable confidence level;

Another further again object of the present inventions is to provide an authentication technique wherein a verifier queries a prover intermittently over time;

An additional other object of the present inventions is to provide authentication with efficient computation per iteration;

A further object of the present inventions is to provide a method for zero-knowledge authentication of a prover by a verifier;

Another object of the present inventions is to provide the novel authentication technique herein called ZEro Knowledge Exploration (ZEKE);

A further other object of the present inventions is to provide an authentication technique using same size, square matrices;

An other further object of the present inventions is to provide an authentication technique using matrices having single digit entries;

An additional other further object of the present inventions is to provide an authentication technique using multivariate quadratic equations;

An additional object of the present inventions is to create a mechanism by which low-powered devices can authenticate themselves to another device by proving that they have access to certain private information;

An additional further object of the present inventions is to provide authentication among devices in an ad-hoc network; and An additional further object of the present inventions is to provide authentication among components in an automobile.

Authentication is performed to a user-selectable confidence level. A prover is iteratively authenticated by a verifier. The iterations are continued until a count of the iterations reaches a number sufficient to achieve a confidence level desired by the verifier. Thus a user can select a confidence level sufficient to satisfy the security requirements of the user's environment. After a delay from completion of the authentication to achieve the desired confidence level, more iterations can continue to achieve a higher confidence level by beginning a new authentication that builds on the result of the previous authentication. During the delay, the verifier can perform tasks in reliance on the result of the earlier authentication. This allows the verifier to query the prover intermittently over time, such as in an ad hoc network or among automobile components. Since each iteration reduces doubt in the result by essentially half, it is possible to accept an early result and take advantage of more confidence checking later. Digital logic, such as a processor and memory, a state machine, or an ASIC performs the authentication.

The authentication of the prover by the verifier uses same size, square matrices filled with binary digit entries. A private key matrix K, a base matrix N are used and a masked matrix M is calculated for the prover based on the private key matrix K and the base matrix N. The public matrix N and the masked matrix M are understood to be public and available to anyone who asks for them, either from a repository or from the prover. A verifier makes an iteration request of the prover. The prover picks a same-size, square matrix S for a given iteration and calculates a same-size, commitment matrix C after the picking of the square matrix S. In the preferred embodiment, the square matrix S is a matrix filled with random binary bits. A two-state request bit is sent from the verifier to the prover after receipt of the commitment matrix C. The request bit is unpredictable from the perspective of the prover. In the preferred embodiment, the two-state request bit is simply a bit chosen in a random or a pseudorandom fashion. On a first state of the request bit, the prover sends the square matrix S to the verifier, and the verifier uses received matrix S and the masked matrix M to verify the commitment matrix C, if not verifiable, then authentication fails, otherwise another iteration is considered. On a second request state of the request bit, the prover calculates a same-size, masked key matrix V from the square matrix S and the private key matrix K and sends the masked key matrix V to the verifier, and the verifier uses received masked key matrix V and the base matrix N to verify the commitment matrix C, if not verifiable, then authentication fails, otherwise another iteration is considered.

To consider another iteration, it is determined whether the desired confidence level is achieved or if an increase in confidence is desired. If so, another iteration is made by returning to make an additional iteration request, otherwise an authentication passes decision is issued.

The details of the preferred embodiments and these and other objects and features of the inventions will be more readily understood from the following detailed description when read in conjunction with the accompanying drawings wherein:

DETAILED DESCRIPTION OF THE PREFERRED EMBODIMENTS

Figure 1:
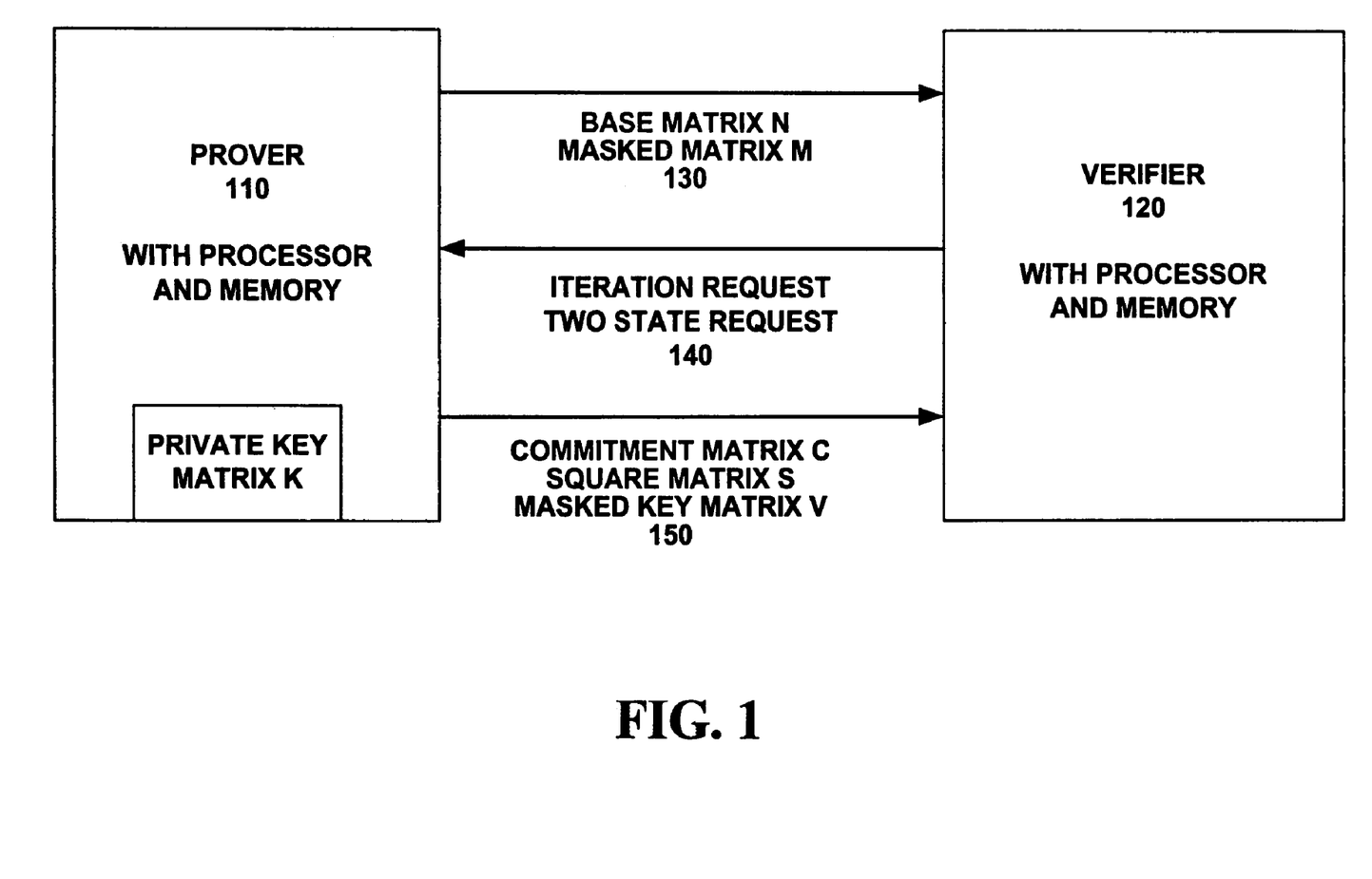
FIG. 1 illustrates a schematic block diagram of a prover and a verifier of the present inventions.

FIG. 1 illustrates a schematic block diagram of a prover 110 communicating with a verifier 120 to perform authentication in an iterative fashion. The authentication of the prover 110 by the verifier 120 uses same size, square matrices filled with binary digit entries.

Prior to an iteration, the prover is provisioned with certain matrices which are assigned to the prover 110 for all iterations. A private key matrix K is established for the prover 110. The private key matrix K is kept private to the prover 110 and not revealed to the public or to the verifier 120. In one preferred embodiment, the private key matrix K can be created and installed in secure memory during manufacture, say at a factory. Alternate embodiments allow the generation of the private key matrix K at other times during a provisioning state.

A base matrix N is picked and a masked matrix M is calculated for the prover 110 based on the private key matrix K and the base matrix N. In the preferred embodiment, the base matrix N is picked and the masked matrix M is calculated by the prover 110 during provisioning. Still in the preferred embodiment, a certificate containing the base matrix N and the masked matrix M is created and signed by the device manufacturer in the factory. In an alternate embodiment, the base matrix N and the masked matrix M are created after the prover 110 has left the factory and are simply stored in memory until needed.

The base matrix N and masked matrix M 130 can be sent to the verifier 120 prior to an initial iteration, either on their own or as part of a certificate. Alternatively, the base matrix N and masked matrix M 130 can be sent after a first iteration request. Then again, the verifier 120 could be provisioned with the base matrix N and the masked matrix M before directly contacting the prover 110.

The verifier 120 verifies the identity of the prover 110 by making authentication and two-state requests 140. The prover 110 transmits same-size square matrices commitment matrix C, square matrix S and masked key matrix V 150 to the verifier 120. Both the prover 110 and the verifier 120 perform some very simple matrix multiplication operations and equality checking. This authenticates the prover's knowledge of the private key matrix K, and, therefore, its identity.

The prover 110 and the verifier 120 are preferably devices having digital logic such as a processor and memory, a state machine or an application specific integrated circuit (ASIC). These devises can be arranged in an ad-hoc network or form network nodes such as RF neurons. Some example applications are components in an automobile or sensors in a building.

Figure 2:
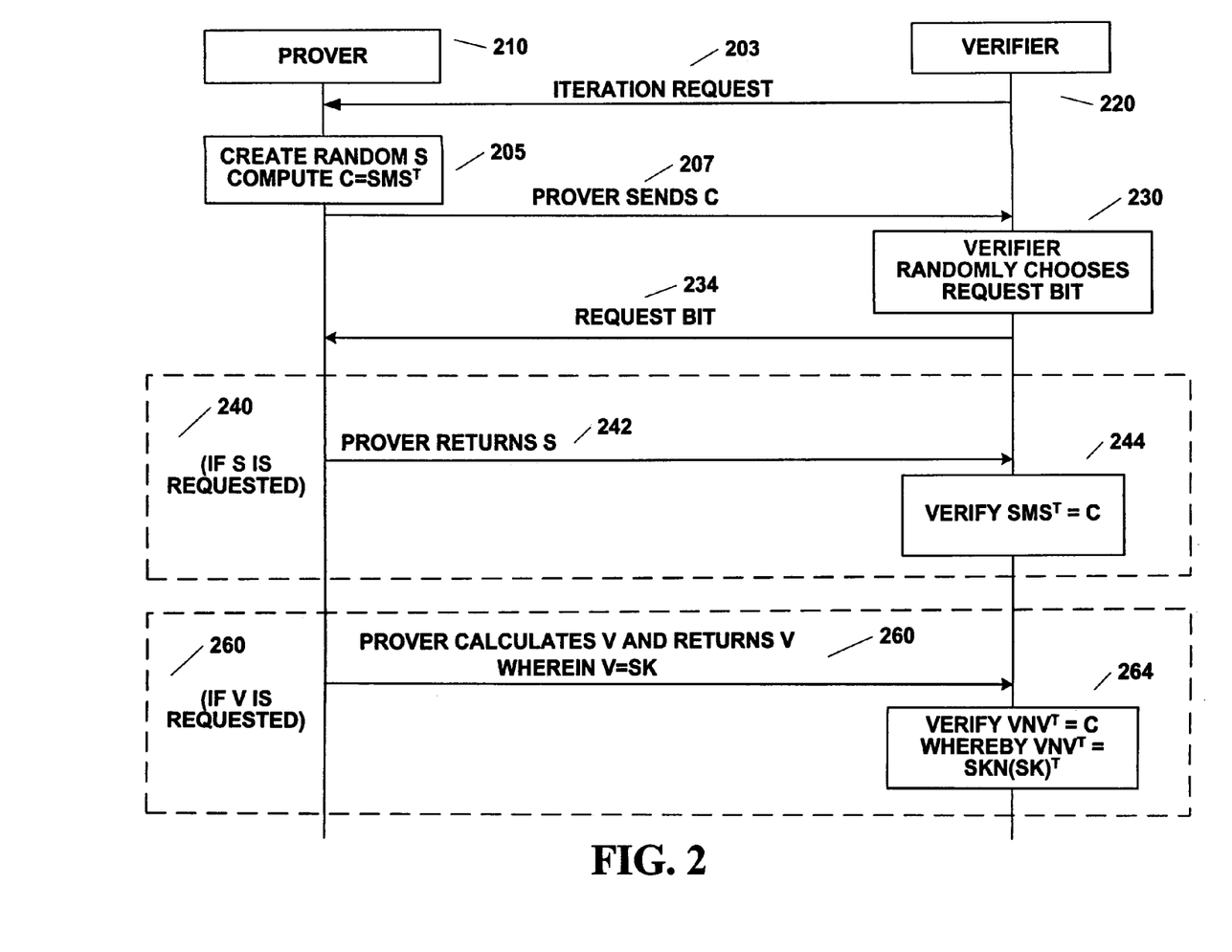
FIG. 2 illustrates a flow diagram of exemplary iteration messages according to the present inventions.

FIG. 2 illustrates a flow diagram of exemplary messages for an iteration.

A private key matrix K is established for the prover 210. The private key matrix K is kept private to the prover 210 and not revealed to the pubic or the verifier 220. A base matrix N is picked. The base matrix N is preferably picked using the same way that the private key matrix K is picked, except that the base matrix N is made public and the private key matrix K is kept private. A masked matrix M is calculated for the prover based on the private key matrix K and the base matrix N. The masked matrix M is calculated as $M=KNK^T$.

At this point, we note that $M=K^TNK$ would work as well, with suitable minor modifications throughout. However, as the masked matrix M, commitment matrix C, square matrix S, and masked key matrix V would all be created in similar fashion, we continue with the single notation, noting that the other is an alternate easily seen by one skilled in the art.

An authentication preferably begins with an iteration request 203 from the verifier 220 to the prover 210. The iteration request 203 is a signal from the verifier 220 to the prover 210 that authentication is required. The iteration request 203 can be sent in any format such as a specified byte request from the verifier 220 to the prover 210 during operation or simply providing power to the prover 210 in system application such as an automobile or an RFID system.

Upon receipt of the iteration request 203, the prover 210 must return a commitment matrix C 207. To accomplish this, the prover 210 picks a same-size, square matrix S 205 for a given iteration and calculates a same-size, commitment matrix C 205 dependent on the square matrix S. In the preferred embodiment, the square matrix S and the commitment matrix C are created 205 in response to the iteration request 203 and then the commitment matrix C is sent 207 to the verifier 220. The commitment matrix C is calculated as $C=SMS^T$.

In an alternative embodiment, the prover 210 does not wait for an iteration request 203 to create the square matrix S and the commitment matrix C 205. In fact, iteration requests 203 are optional if the provers 210 know to generate 205 and send out new commitment matrices C 207—such as intermittently or whenever a device is receiving power. In this alternative embodiment, the square matrix S and the commitment matrix C are created 205 prior to receipt of the iteration request 203 and stay in memory of the prover 210 until an iteration request 203 is received. When an iteration request 203 is received, the stored the commitment matrix C is sent 207 to the verifier 220.

In the preferred embodiment, the values of the entries in the square matrix S are chosen randomly. The prover 210 creates a square matrix S. The prover 210 then computes a commitment matrix C as $C=SMS^T$ and send the commitment matrix C to the verifier 220.

The verifier 220 chooses a request bit at 230 and sends the request bit to the prover 210 at 234. The request bid indicates to the prover whether to return the square matrix S or to return the masked key matrix V. In the preferred embodiment, the request bit is chosen randomly (or psuedorandomly) upon receipt of the commitment matrix C. In an alternate embodiment, however, the sequence of request bits could be pre-generated and stored for retrieval by the verifier 220 when necessary. Other embodiments are easily envisioned to one skilled in the art.

Depending on the state of the request bid chosen by the verifier 220, the prover 210 returns the square matrix S at 242 if S is requested 240. If V is requested 260, the prover calculates the masked key matrix V and returns the masked key matrix V. The masked key matrix. V is calculated as $V=SK$.

The returned result is then verified to determine if the iteration passes or fails. If S was requested 240, the verification $SMS^T=C$ is performed at 244. If V was requested 260, the verification $VNV^T=C$ is performed at 264, whereby $VNV^T=(SK)N(SK)^T=SKNK^TS^T=S(KNK^T)S^T=SMS^T$. If equality holds, the iteration is determined to pass and if equality does not hold, the iteration is determined to fail.

After an iteration is performed, a decision needs to be made whether further iterations are needed. The following flowchart of FIG. 3 addresses such a decision based on user-selected confidence level and the current iteration.

Figure 3:
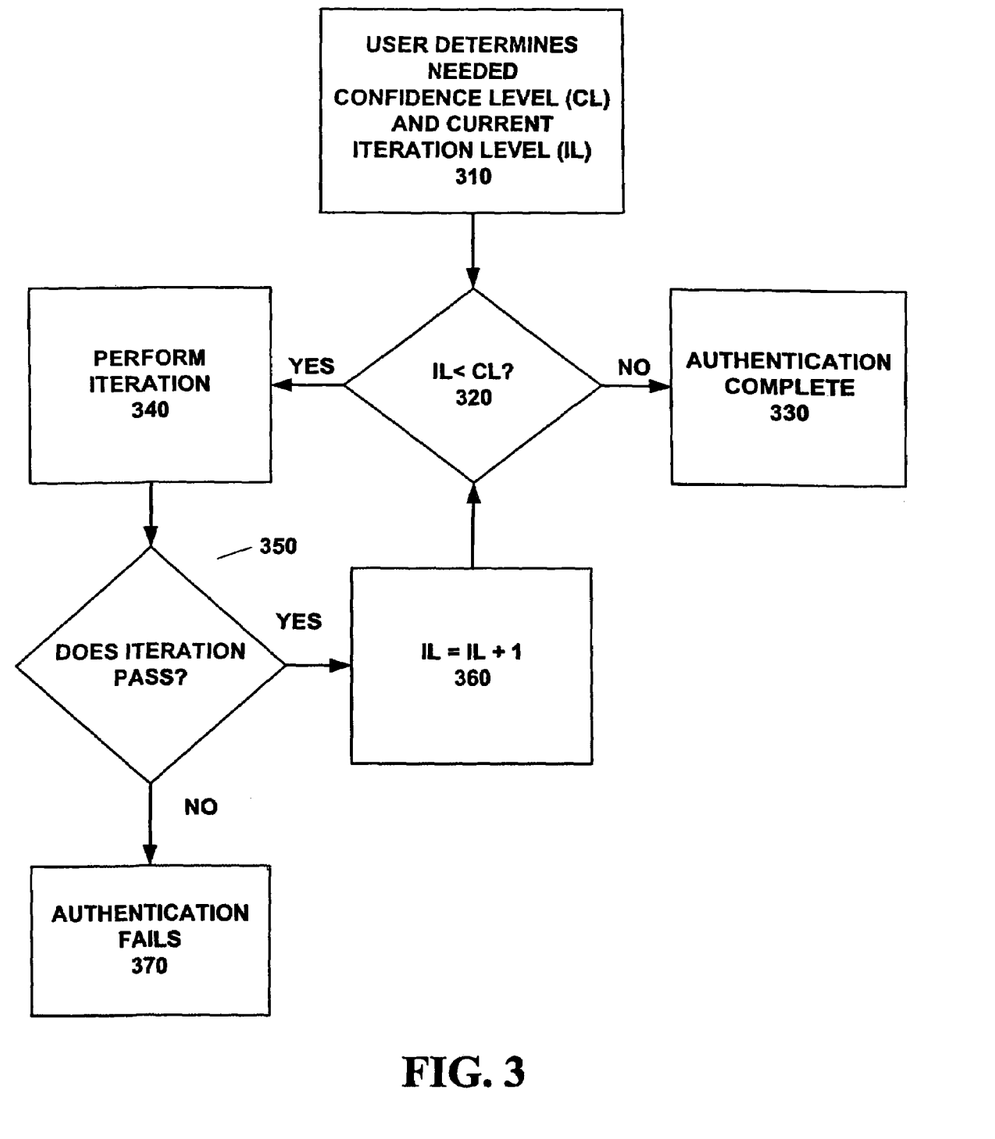
FIG. 3 illustrates a flow chart of a user-selected confidence level authentication according to the present inventions.

FIG. 3 illustrates a flow chart of a user-selected confidence level and iteration level. A user, such as that of a verifier, determines a needed confidence level (CL) at step 310. Determination of a confidence level allows the user to select the level of security or confidence needed. Prior authentication techniques were unable to select desired confidence level by the user or verifier that varied from authentication to authentication. Also, according to the present inventions, subsequent increases in confidence can be achieved by building on the result of all previous authentications without starting over as was required by prior authentication techniques. This is possible in part because the way the zero knowledge authentication is deployed by the present inventions.

At step 310 it is also determined in the verifier what the current iteration level (IL) is. If it is starting from the beginning, the current iteration level (IL) would be zero. If it is building upon the result of the previous authentication, say after a delay to perform some intermediate task using the previous authentication result, then the iteration level (IL) would be a larger number than zero. Thus the present inventions allow for more efficient computation by building upon a prior result. Thus, a user can determine, at what confidence level point to quit and later have an opportunity to resume again with no loss in security efficiency. Because each iteration reduces doubt in the result by essentially half, it is possible for a user or verifier to rely on and use an early result and take advantage of more confidence checking later. Mathematically speaking, each iteration reduces doubt by exactly half plus a probability that a dishonest prover happens to pick a correct return value. A dishonest prover in cryptography is a prover without access to the private key, in this case the private key matrix K.

The current iteration level (IL) is then compared against the needed confidence level (CL) at step 320. If the current iteration level (IL) is not less than the needed confidence level (CL), then the authentication is complete at step 330. If the current iteration level (IL) is less than the needed confidence level (CL), then an iteration is performed at step 340. Details of an iteration will later be described below in detail with respect to the flowchart of FIG. 4.

After the iteration of step 340, it is determined whether the iteration passed at step 350. If the iteration does not pass, then authentication fails at step 370. If the iteration passed, the count value of the iteration level (IL) is incremented at step 360 and flow continues to step 320 where it is again determined whether the current iteration level (IL) is less than the needed confidence level (CL). Depending on the result, authentication continues in iterative fashion.

Figure 4:
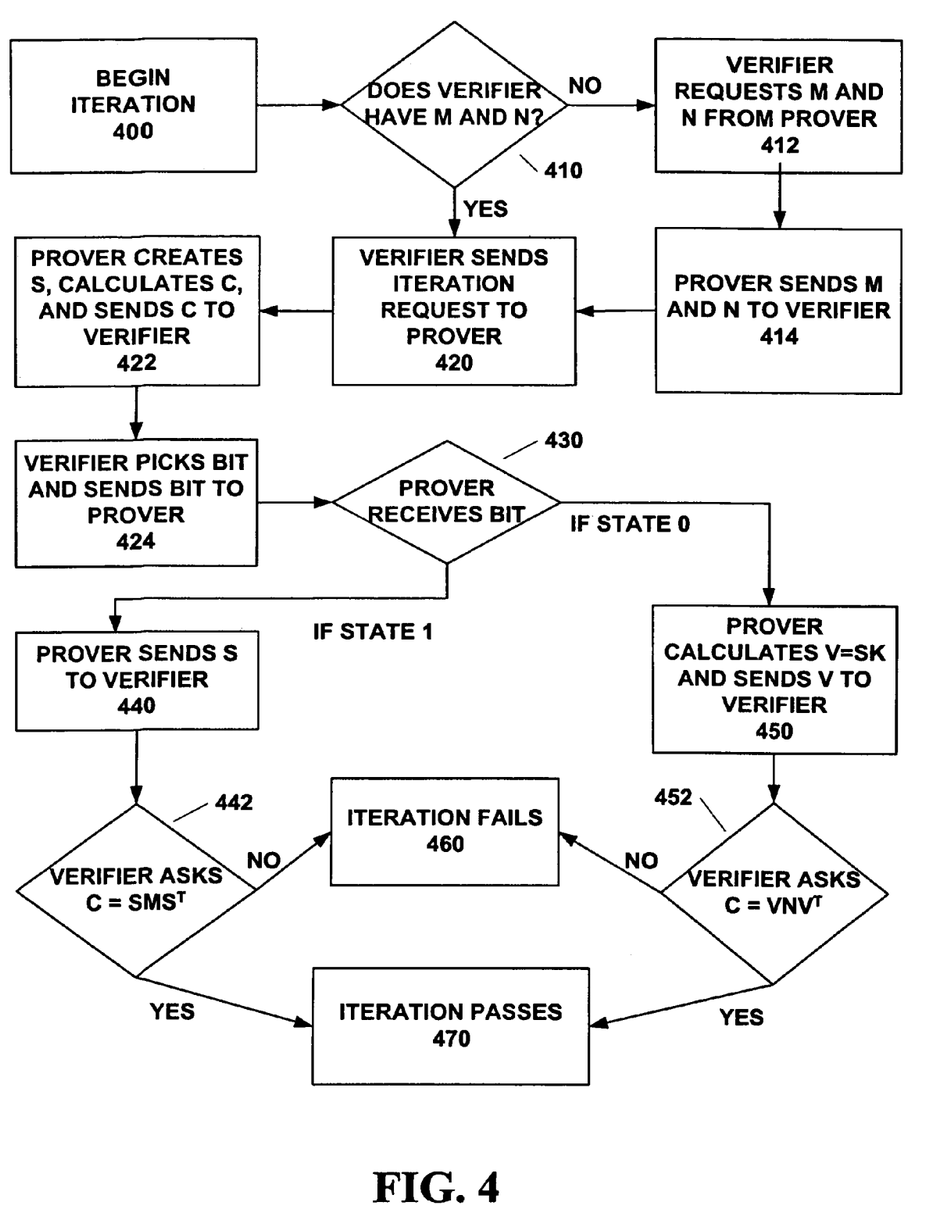
FIG. 4 illustrates a flow chart of a zero-knowledge iteration according to the present inventions.

FIG. 4 illustrates a flow chart of a zero-knowledge iteration. The iteration steps illustrated in FIG. 4 correspond to the iteration step 340 of FIG. 3 and to the iteration pass question 350 of FIG. 3. An iteration begins at step 400. At step 410 it is determined whether the verifier has the masked matrix M and the base matrix N. If the verifier does not have the base matrix N and the masked matrix M, then the verifier requests matrices from the prover at step 412 and the prover sends the base matrix N and the masked matrix M to the verifier at step 414. Otherwise, flow continues to step 420. At step 420, the verifier sends an iteration request to the prover.

The prover then creates the square matrix S, calculates the commitment matrix C and sends the commitment matrix C to the verifier at 422. The verifier then picks a random request bit and sends the bit to the prover at step 424. At step 430 the prover receives the random request bit and determines if the bit is a first state or a second state. If a first state is received, represented arbitrarily as one, then the prover continues to step 440. If a second state is received, represented arbitrarily as a zero, then the prover continues to step 450.

At step 440, the prover sends the square matrix S to the verifier and the verifier asks if $C=SMS^T$. If the result of the verification question is no, then the iteration fails at step 460. This corresponds to step 370 in FIG. 3. If the result of the step 442 verification question is yes, then the iteration passes at step 470. This corresponds to moving from step 350 to step 360 in FIG. 3.

At step 450, the prover calculates a masked key matrix V by calculating $V=SK$. The prover then sends the masked key matrix V to the verifier and the verifier asks if $C=VNV^T$. If the result of the step 452 verification question is no, then the iteration fails at step 460. This corresponds to step 370 in FIG. 3. If the result of the verification question is yes, then the iteration passes at step 470. This corresponds to moving from step 350 to step 360 in FIG. 3.

A selectable confidence level is achieved when iteratively authenticating a prover by a verifier. Iterations are continued until a count of the iterations reaches a number sufficient to achieve a confidence level desired by the verifier. The confidence level desired by the verifier can be selected in different ways. For example, the confidence level can be selected by a user of a device performing the verification. The confidence level can be predetermined, or predetermined for particular environments, times of day or events.

In the automotive example, the confidence level for each component prover is determined by the rigorous requirements placed on a particular component. In a banking environment, the confidence level may be determined by an amount of risk taken. An advantage of the selectable confidence level of the authentication of the present inventions is the computational efficiency. The result of authentication can be used to perform a task during a delay such as some time passage. After using the result of authentication, if the verifier needs a higher confidence level, authentication can resume using the previous result without having to start all over from a zero trust level. This allows one to start an automobile or begin doing business without waiting for complete authentications while still providing for efficient higher authentications when needed at a later time.

The verifier and prover interact in an iterative way to allow a decision by the verifier whether or not to authenticate the prover. This is accomplished by sending certain same-size square matrices from the prover to the verifier and sending a random request bit from the verifier to the prover.

Initially, the prover must establish a private key matrix K for the prover device. This private key matrix K is a square matrix of a predetermined size and is preferably set to the device permanently such as at the time of device manufacture. The prover chooses a base matrix N of the same size as the private key matrix K. In the preferred embodiment, the base matrix N is unique to each device. However, in an alternate embodiment, the base matrix N may be shared by multiple devices. In any case, the base matrix N should not vary per iteration. The prover makes this base matrix N available to one or more of the verifiers. Though this can be revealed in advance of authentication, the base matrix N does not need to be revealed until an iteration request is received by the prover.

Also, at the outset, the prover calculates a masked matrix M of the same size as the base matrix N. The masked matrix M is calculated from the private key matrix K and the base matrix N.

$M=KNK^T$

We note that the masked matrix M will be unique to each device, since the private key matrix K is unique to each device. The prover makes this masked matrix M available to one or more of the verifiers. Though it can be revealed in advance of authentication, the masked matrix M does not need to be revealed until an iteration request is received by the prover.

A verifier then makes an iteration request of the prover.

The prover picks a same-size, square matrix S for this iteration after the iteration request. The square matrix S can be considered a matrix filled with random bits.

Then the prover calculates a same-size, commitment matrix C for this iteration based on the picked square matrix S.

$C=SMS^T$

The prover then sends the commitment matrix C to the verifier. After the verifier receives the commitment matrix C, the verifier sends a two-state request bit to the prover.

On a first request state of the request, the prover sends the square matrix S to the verifier, and the verifier uses received square matrix S and the masked matrix M to verify the commitment matrix C.

The verifier checks if $SMS^T=C$.

If not verifiable (i.e. $SMS^T \neq C$), then the authentication fails. Otherwise, the verifier determines if another iteration is needed based on the principles of the user-selected confidence level discussed above. A pass decision is then issued or another iteration request is made.

On a second request state of the request, the prover calculates a same-size, masked key matrix V based on the square matrix S and the private key matrix K for this iteration. The masked key matrix V received is representative of the square matrix S and a private key matrix K.

$V=SK$

Then the prover sends the masked key matrix V to the verifier, and the verifier uses received masked key matrix V and the base matrix N to verify the commitment matrix C.

The verifier checks if $VNV^T=C$.

If not verifiable (i.e. $VNV^T \neq C$), then authentication fails. Otherwise, the verifier determines if another iteration is needed based on the principles of the user-selected confidence level discussed above. A pass decision is then issued or another iteration request is made.

The private key matrix K, the base matrix N, the masked matrix M, the square matrix S, the commitment matrix C, and the masked key matrix V have entries that are preferably binary digits (elements of GF(2)) to achieve computational efficiency and thus conserve processing resources. It is also preferred that the size of these matrices is no less than about 24×24 in the preferred embodiment to achieve balance between computational efficiency and security.

A scalable authentication scheme is good for a number of applications, where a single strong authentication is not needed or practical in all cases.

Ad hoc networks are networks wherein the nodes are assumed to have no prior knowledge of each other. They may not have even been provisioned by a certification authority (or they may have). In either model, a low level of trust may be initially established, to be replaced by a higher level in certain circumstances. Merely establishing the identity of a neighbor may be cheap, for example, but trusting that node as a router for your messages might require a higher level of authentication. In models where trust doesn't come from a central authority, scalable authentication can be used to establish identity for the trust model in use, too, with trust being established over days or weeks, if the processor is very weak.

Any application wherein a central master is in charge of a number of lesser devices, a good case can be made for scalable authentication. A low-level degree of authentication can be maintained at most times, but in the case of a critical time/event, the individual security level can be raised to a much higher level quickly and efficiently. An example of this type of system is an alarm master controlling multiple sensors. The sensors can be trusted at a certain level (say 40 bits) in general but contradictory or unusual reports must be accompanied by a higher trust level. The scalable authentication model allows this higher trust level to be achieved without needing to start over from an individual trust level of zero, too, which distinguishes it from other tiered-authentication-level schemes.

At the lowest level, scalable authentication might be used within a single computer. In general, the main processor cares only minimally about the authenticity of many of the peripherals, but certain applications and/or certain peripherals may require a higher level of trust. For example, a digital rights management (DRM) application may wish to verify the speakers (or sound card) to which content is sent at a higher level than will the general user interface. A cryptographic coprocessor might be expected to prove its authenticity, and so on. Scalable authentication gives rise to new models when trying to build a secure system.

Once scalable authentication concepts become more widely accepted, more applications will naturally arise. These examples are not meant to be comprehensive, but rather to give a flavor of the potential applications of scalable authentication.

Figure 5:
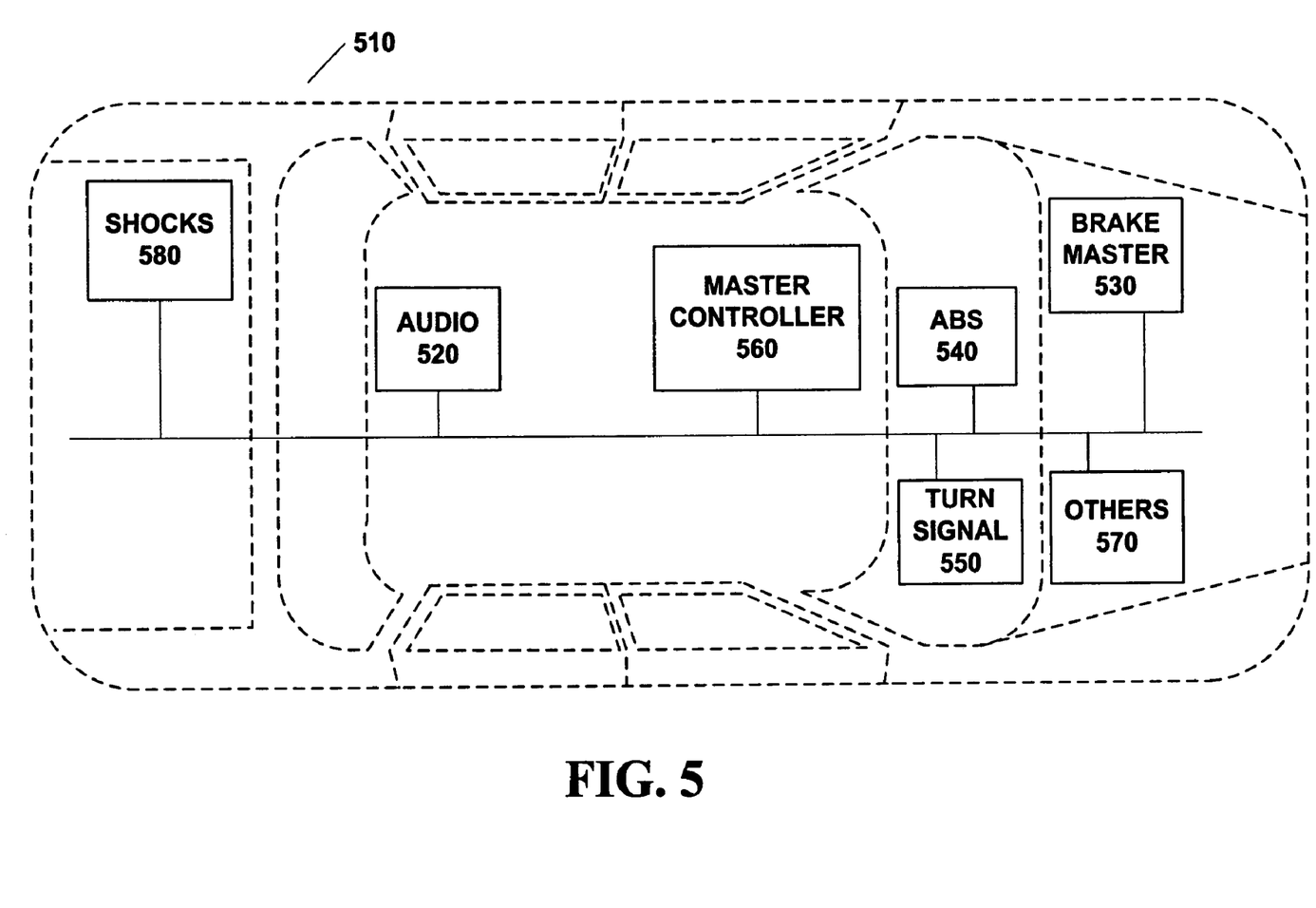
FIG. 5 illustrates an exemplary application of prover and verifier components in an automobile according to the present inventions.

FIG. 5 illustrates an exemplary application of prover and verifier components in an automobile according to the present inventions. A computer such as a master controller 560 controls an entire automobile. The master controller 560 must trust each component to do what it is told, but some parts are more important than others—for example, the trustworthiness of an antilock braking system 540 or a brake master cylinder 530 is much more important than that of the turn signal 550, although the master controller 560 would ideally have some assurance that all parts are legitimate and behaving as expected. Other examples are shocks 580, audio systems 520 among others such as 570. These components of an intra-vehicle network are very low-power and can only prove small things at a time, but the computer of the master controller 560 has to trust them all. It can scale its trust level to each device independently, all within the same framework.

Additionally, the computer of the master controller 560 knows that certain instances require different values of trust. A drive may begin on flat ground in good weather conditions and the shock absorbers and brakes have only a certain level of trust, limited by computation and time. As the drive progresses, the road gets wet and the computer senses this. It is now even more important to trust the brake master 530. Only under the proposed scheme can the brake master 530 iteratively prove its authenticity. In known existing authentication schemes, it would require a complete new authentication from scratch, which is very time-consuming for low-end devices. If the road conditions deteriorates, a similar authentication improvement step can be done with the shocks 520, without affecting any of the other systems on the automobile 510.

Increasingly, automobile components are becoming more and more like a small computer network, with a central master computer monitoring everything from exhaust to fuel intake to the road condition. All of these are used as inputs to the master computer, which decides on the actions of the car, to an extent. The master computer wants to verify the authenticity of the sensors fairly highly, as it uses their output as important information. This information is used to make the car run more safely, more efficiently, and/or more cleanly.

The master computer also wants to verify the authenticity of many of the other car parts—the turns signal, lights, shocks/struts, etc. However, the level of authentication needed is not as high (e.g. an untrusted turn signal is not as threatening to the safe operation of the vehicle as an untrusted brake system) and cost per part is more important. A low level of authentication of some parts is perfectly acceptable—it makes building fraudulent parts difficult but a single fraudulent part is not a significant safety concern for the driver of the vehicle or an economic concern for legitimate parts makers.

Nevertheless, the overall security level of the authentication systems in the vehicle must be high. A low overall security level would allow for a single break to provide for easy forgery of parts, or worse, of the important sensors that provide valuable information to the master computer. The sensors need reasonably high individual trust levels, however, while the peripheral devices need only a minimal individual trust level.

Another application is with RF neurons and other very low-power devices which have a need to authenticate. Very little processor power can be dedicated to security and a scalable approach which can run in reasonable time "in the background" is required.

A third application is within a single handheld device. As handheld devices become more and more complex, it is not at all unlikely that there will be a need for various nodes within a device to authenticate other nodes. Scalable authentication is a very natural fit for this as well.

Authentication is a means of proving identity. Typically, in the digital world, a certificate containing public information related to private information known to be held by a single entity (a device, an individual, or a company) is certified by a trusted third party. A short interactive protocol is done to convince the verifier (the one requesting authentication) that the prover (the one trying to show authenticity) has the private information related to the trusted public information.

The certificate's role is to bind the public key to a specific entity. This is typically accomplished by a signed certificate. This is well under stood prior art and we are not proposing any changes to this portion of an authentication procedure. The general way the prover shows possession of the private information is challenge-and-response. The verifier first issues a random nonce to the prover. The prover then signs this nonce and returns it to the verifier, who verifies the signature, and, thus, the identity of the prover.

We differentiate between two different security parameters that are often conflated. We define the overall security level of an authentication system as the amount of work required to break the system. This is the amount of work required to break the hard underlying problem upon which a cryptographic authentication system is built. In general, the overall security level must be very high, as a break of the overall security level defeats all components within the entire system. The overall security level also will often be the major factor in determining the speed of operations within an authentication protocol.

We also consider a new security parameter. We define individual trust level as the trust level that has been achieved between two entities. The individual trust level is bounded above by the overall security level and can never exceed it. However, the individual trust level can vary anywhere between 0 and the overall security level. We will follow a convention of describing the individual trust level as a number, typically as "bits of security" so that an individual trust level of 20 means the work involved to break that trust by a hacker is about $2^{20}$ or that the odds of a single successful attack are about $2^{-20}$.

In the most popular authentication systems in use today, RSA and ECC, the individual trust level is either 0 (no authentication at all has been done) or equal to the overall security level of the system (fully authenticated). The middle ground is ignored. While this is acceptable and even desirable in many applications, it is not in others.

Different individual trust levels for different devices are necessary and desirable when the amount of processing available for security is extremely limited. Even in such situations, the overall security level must be kept high, to prevent a malicious entity from destroying the entire system, but we allow for lower individual trust levels to save on processor time requirements or because of limitations in either hardware or software of a device.

Current challenge-response protocols do not have this flexibility. They require a single, expensive operation and achieve the highest individual security level possible or have no security at all. This inefficiency can be excused in many applications (where processor cycles are cheap or full security is essentially always required), but forcing systems where scalable authentication is superior into this mold too often causes security to be cut all-together. This can occur because the single challenge-response protocol is simply too expensive (in terms of hardware gates or program size or program memory or time to run) to implement. Flexibility in the security model will allow some security where there was none before.

The ZEKE (ZEro Knowledge Exploration) system of the present inventions is designed to fit the demanding criteria of a modern business solution. Any scalable authentication system should have the following characteristics.

1. Few processor cycles—ideally less than RSA or ECC even for a comparable individual trust level. This makes the security processing either fast or have a minimal impact on the speed of the rest of the operations required within the unit.
2. Small ROM/RAM requirements—significantly less than RSA or ECC in either software or hardware. This is directly related to the cost of implementing the security system.
3. Secure—the overall security parameter must be high enough to withstand attack in the foreseeable future. Work to break of $2^{128}$ or higher is a good initial benchmark.
4. Easy to implement—an average programmer should be able to produce a fully working version of the entire system in a reasonable period of time. This requirement is softer than some of the others, in that a really complicated but excellent system could be purchased, but personalized implementations will often be a design goal of many corporations.

While the theory plays out similarly for the matrices base matrix N, masked matrix M, square matrix S, private key matrix M, commitment matrix C, and masked key matrix V to be over any field, we prefer the embodiment where each is defined over GF(2)—that is, binary matrices. There is an obvious trade-off between the overall security level and the size of the matrices. We recommend 24×24 matrices, so that the key and all matrices are 576 bits. We judge this to be a reasonable size for public-key authentication keys and transmissions.

We consider the general problem of considering each bit of the private key matrix K as an independent variable. Throughout, we will number the key bits from 0 to 575, identifying each with a particular matrix. That is, $K=(K_0 K_1 K_2 \ldots K_{575})$, with each $K_i=0$ or 1. Similarly, we identify both notations with the matrix $$\begin{bmatrix} K_0 & K_1 & K_2 & \cdots & K_{23} \\ K_{24} & K_{25} & K_{26} & \cdots & K_{47} \\ K_{48} & K_{49} & K_{50} & \cdots & K_{71} \\ \vdots & \vdots & \vdots & \ddots & \vdots \\ K_{552} & K_{553} & K_{554} & \cdots & K_{575} \end{bmatrix}$$

It should be straightforward to pass between these different notations and we will not explicitly state which notation we are considering. All represent identical values. Whenever multiplication is done with full variables (K, C, N, etc.), it is considered to be matrix multiplication. Whenever subscripted variables (e.g $K_1$, $N_{333}$, $C_{502}$) are used, we are considering bit-wise operations (more generally, operations in the defining field).

From this beginning, we can calculate the $M_i$ values in terms of the $K_i$ and $N_i$ values, with the $N_i$ known. Simply setting up the matrix multiplication $$\begin{bmatrix} K_0 & K_1 & K_2 & \cdots & K_{23} \\ K_{24} & K_{25} & K_{26} & \cdots & K_{47} \\ K_{48} & K_{49} & K_{50} & \cdots & K_{71} \\ \vdots & \vdots & \vdots & \ddots & \vdots \\ K_{552} & K_{553} & K_{554} & \cdots & K_{575} \end{bmatrix} * \begin{bmatrix} N_0 & N_1 & N_2 & \cdots & N_{23} \\ N_{24} & N_{25} & N_{26} & \cdots & N_{47} \\ N_{48} & N_{49} & N_{50} & \cdots & N_{71} \\ \vdots & \vdots & \vdots & \ddots & \vdots \\ N_{552} & N_{553} & N_{554} & \cdots & N_{575} \end{bmatrix} *$$

$$\begin{bmatrix} K_0 & K_{24} & K_{48} & \cdots & K_{552} \\ K_1 & K_{25} & K_{49} & \cdots & K_{553} \\ K_2 & K_{26} & K_{50} & \cdots & K_{554} \\ \vdots & \vdots & \vdots & \ddots & \vdots \\ K_{23} & K_{47} & K_{71} & \cdots & K_{575} \end{bmatrix}$$

yields a 24×24 matrix with entries defined in terms of the $N_i$ and $K_i$. We will call this matrix intermediate matrix Q. As an example, the first term ($Q_0$) is the double sum $$\sum_{j=0}^{23} \sum_{i=0}^{23} K_j N_{24i+j} K_i.$$

We then set Q=M, which yields 576 equations in the $Q_i$ and $M_i$. Since the $N_i$ and $M_i$ are known, this provides a system with 576 unknowns (the $K_i$), where the equations are generally quadratic. Not all equations are truly quadratic, as many linear terms are intermixed into the degree two terms on the diagonals.

This is exactly an instance of the Multivariate Quadratic (MQ) problem, which is known to be NP-complete in its full generality. The hard problem underlying both RSA and Elliptic Curve cryptography is the discrete log problem. The hard problem underlying this system is solving a multivariate quadratic system of equations (MQ), a fundamentally different mathematical hard problem. This can be important as there is a known quantum algorithm for solving the discrete log problem, but there is no known quantum algorithm for solving MQ.

It is fairly obvious that performing a single round of ZEKE will be quite cheap. It consists of generating a (psuedo)random number and performing a few matrix multiplications. In either software or hardware, matrix multiplication is very cheap. We look at the exact requirements and compare them with some of the more popular authentication mechanisms currently in use.

The verifier is only required to store a few items. These are listed here:
1. K stored securely (576 bits)
2. N stored (576 bits)
3. Strong pseudorandom number generator (PRNG)
4. Matrix multiplier
5. (Opt.) M stored (576 bits)—can be re-generated
6. (Opt.) Certificate with N, M on it, signed by a CA This is very minor compared to the typical public-key requirements. RSA, for example, needs to save a 1024-bit key securely, as well as a 1024-bit modulus (or two 512-bit primes securely, for speed), as well as typically a hash algorithm and a very expensive modular multiplier (about two orders of magnitude more RAM/ROM or gates than a simple matrix multiplier). Depending on the padding used, a PRNG might also be required. The signed certificate is also typically stored on the device, in the same instances ZEKE would require.

ZEKE performs reasonably favorably against standard authentication mechanisms, even with a full 80 rounds, making the individual security parameter of ZEKE match the overall security parameter of the more common authentication mechanisms. Additionally, since ZEKE scales linearly with individual security parameter (up to the overall security level), it will perform better in the near 128-bit range than current methods, which scale with time polynomial in the required security level.

In hardware, ZEKE should perform even better, as vector multiplication is extremely fast. Each bit of the output matrix could be computed with as few as 47 gates-24 AND gates and 23 XOR gates to combine the output. 47 gates and 576 cycles is one possible option, but it scales very nicely (e.g. 94 gates would require 288 cycles and so forth). This is a huge improvement over the gate count required for either RSA or ECC, which is especially important for very low-cost devices, or where security can only be a very small additional per-unit cost.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure. For example, although multiple examples are disclosed (banking, automotive, DRM, components within a handheld device, ad hoc networks, building sensors, etc.), the inventions are applicable to any system where authentication would be required. A non-comprehensive list includes purchasing goods online, RF-based user identification systems, online gaming systems, and secure asset tracking.

What is claimed is:

1. An authentication method having a selectable confidence level, comprising the steps of:
   (a) iteratively interacting between a prover and a verifier, wherein the prover and verifier are electronic devices that perform calculations and pass values between themselves that result from the calculations;
   (b) determining from at least one of the values whether each iteration yields one of a pass and fail result, wherein each iteration that yields a pass result establishes an authentication confidence level that is greater than an authentication level from a previous iteration, and wherein a fail result stops the iterations;
   (c) continuing to perform iterations, so long as each iteration achieves a pass result, until a count of iterations reaches a number sufficient to achieve a first authentication confidence level desired by the verifier;
   (d) allowing performance of a first task by the verifier in reliance on the first authentication confidence level;
   (e) continuing to perform iterations, so long as each iteration achieves a pass result, until a count of iterations reaches a number sufficient to achieve a second authentication confidence level desired by the verifier;
   (f) allowing performance of a second task by the verifier in reliance on the second authentication confidence level desired by the verifier; and
   (g) disallowing performance of the at least one task by the verifier when an iteration achieves a fail result before the second authentication confidence level is met.

2. An authentication method having a selectable confidence level according to claim 1, wherein each iteration reduces doubt in the result by essentially half.

3. An authentication method having a selectable confidence level according to claim 1, wherein the number sufficient to achieve the first authentication confidence level desired by the verifier in said step (c) is a number chosen by the verifier sufficient to satisfy the security requirements of an environment of at least the verifier.

4. An authentication method having a selectable confidence level according to claim 1, wherein the method is performed among an ad-hoc network of the prover and at least one verifier.

5. An authentication method having a selectable confidence level according to claim 1, wherein the prover is an automobile component and the verifier is an automobile system controller.

6. A verifier device comprising digital logic for performing the steps of claim 1.

7. An authentication method having a selectable confidence level according to claim 1, wherein said step (a) of iteratively interacting between a prover and a verifier uses same size, square matrices.

8. An authentication method having a selectable confidence level according to claim 7, wherein entries of binary digits fill the same size, square matrices used in said step (a) of iteratively authenticating a prover by a verifier.

9. An authentication method having a selectable confidence level according to claim 7,
   wherein said step (a) comprises the substeps of:
   (a)(a) establishing a private key matrix K, wherein the private key matrix K is a square matrix of a predetermined size;
   (a)(b) choosing a base matrix N of the same size as the private key matrix K;
   (a)(c) calculating a same-size, masked matrix M;
   (a)(d) picking by the prover a same-size, square matrix S for this iteration;
   (a)(e) calculating by the prover a same-size, commitment matrix C after the picking of the square matrix S in said step (a)(d) and sending the commitment matrix C from the prover to the verifier; and
   (a)(f) sending a request from the verifier to the prover after the receipt of the commitment matrix C in said step (a)(e), wherein the request comprises at least first and second request states;
   wherein said step (b) comprises the substeps of:
   (b)(g) on a first request state of the request, (b)(g)(1) the prover sending the square matrix S to the verifier, and (b)(g)(2) the verifier using received matrix S and the masked matrix M to verify the commitment matrix C, if not verifiable, then authentication fails, otherwise go to step (c)(i); and (b)(h) on a second request state of the request, (b)(h)(1) the prover calculating a same-size, masked key matrix V from the square matrix S and the private key matrix K and sending the masked key matrix V to the verifier, and (b)(h)(2) the verifier using received masked key matrix V and the base matrix N to verify the commitment matrix C, if not verifiable, then authentication fails, otherwise go to step (c)(i); and wherein said step (c) comprises the substeps of:

(c)(i) determining whether to make another iteration to improve confidence and, if so, returning to step (a)(d) to make an additional iteration, otherwise issuing a pass decision.

10. A method in a prover of authenticating a prover using same-size square matrices, wherein the prover has a private key matrix K and a base matrix N, wherein the private key matrix K is a square matrix of a predetermined size, and wherein the base matrix N is of the same size as the private key matrix K, and wherein the prover has a masked matrix M, wherein the masked matrix M is of the same size as the base matrix N, the method comprising the steps of:

(a) picking a square matrix S of the same size as the private key matrix K;

(b) calculating a same-size, commitment matrix C based on the square matrix S and the masked matrix M and sending the commitment matrix C to at least one verifier;

(c) receiving a request from the verifier, wherein the request comprises at least first and second request states;

(d) on a first request state of the request, sending the square matrix S to the verifier; and (e) on a second request state of the request, calculating a same-size, masked key matrix V from the square matrix S and the private key matrix K and sending the masked key matrix V to the verifier, wherein the prover and verifier are electronic devices.

11. A method according to claim 10, wherein the masked matrix M is calculated based on the private key matrix K and the base matrix N.

12. A method according to claim 11, wherein $M=KNK^T$.

13. A method according to claim 11, wherein the masked key matrix V calculated in said step (e) as V=SK.

14. A method according to claim 10, wherein the square matrix S picked in said step (a) is a matrix with random entries.

15. A method according to claim 10, wherein the calculating of the commitment matrix C in said step (b) calculates the commitment matrix C based on $C=SMS^T$ for this iteration.

16. A method according to claim 10, wherein the private key matrix K, the base matrix N, the masked matrix M, the square matrix S, the commitment matrix C, and the masked key matrix V have each entry being a binary digit.

17. A method according to claim 16, wherein the size of the private key matrix K, the base matrix N, the masked matrix M, the square matrix S, the commitment matrix C, and the masked key matrix V are of no less then about 24×24.

18. A prover device comprising digital logic for performing the steps of claim 10.

19. A method in a verifier of deciding whether or not to authenticate a prover using same-size matrices, wherein the prover provides a base matrix N and a masked matrix M, wherein both the base matrix N and the masked matrix M are square matrices of a predetermined size, the method comprising the steps of:

(a) receiving a same-size, commitment matrix C from the prover;

(b) choosing one of at least first and second request states and sending the chosen request state to the prover;

(c) on a first request state of the request, receiving from the prover a same-size, square matrix S and using the square matrix S and the masked matrix M to verify the commitment matrix C;

(d) on a second request state of the request, receiving a same-size, masked key matrix V from the prover and using the received masked key matrix V and the base matrix N to verify the commitment matrix C; and (e) if the commitment matrix C is unverifiable, then authentication fails, wherein the prover and verifier are electronic devices.

20. A method according to claim 19, further comprising the step of (f) determining whether to make another iteration to improve confidence and, if so, repeating from said step (a), otherwise issuing a pass decision.

21. A method according to claim 20, wherein said step (f) of determining whether to make another iteration to improve confidence continues iterations until a count of the iterations reaches a number sufficient to achieve a confidence level desired by the verifier.

22. A method according to claim 19, wherein the request sent from the verifier to the prover in said step (c) is unpredictable from the perspective of the prover.

23. A method according to claim 19, wherein the verification of the commitment matrix C in said step (c) verifies $SMS^T=C$; and wherein the verification of the commitment matrix C in said step (d) verifies $VNV^T=C$.

24. A method according to claim 19, wherein the base matrix N, the masked matrix M, the square matrix S, the commitment matrix C, and the masked key matrix V have each entry being a binary one or zero.

25. A method according to claim 24, wherein the size of the base matrix N, the masked matrix M, the square matrix S, the commitment matrix C, and the masked key matrix V are of no less then about 24×24.

26. A verifier device comprising a digital logic for performing the steps of claim 19.

27. A method of deciding whether or not to authenticate a prover using same-size square matrices, the method comprising the steps of:

(a) establishing a private key matrix K, wherein the private key matrix K is a square matrix of a predetermined size;

(b) choosing a base matrix N of the same size as the private key matrix K;

(c) calculating a same-size, masked matrix M;

(d) picking by the prover a same-size, square matrix S for this iteration;

(e) calculating by the prover a same-size, commitment matrix C after the picking of the square matrix S in said step (d) and sending the commitment matrix C from the prover to the verifier;

(f) sending a request from the verifier to the prover after the receipt of the commitment matrix C in said step (e), wherein the request comprises at least first and second request states;

(g) on a first request state of the request, (g)(1) sending the square matrix S from the prover to the verifier, and (g)(2) the verifier using received matrix S and the masked matrix M to verify the commitment matrix C, if not verifiable, then authentication fails, otherwise go to step (i);

(h) on a second request state of the request, (h)(1) the prover calculating a same-size, masked key matrix V from the square matrix S and the private key matrix K and sending the masked key matrix V to the verifier, and (h)(2) the verifier using received masked key matrix V and the base matrix N to verify the commitment matrix C, if not verifiable, then authentication fails, otherwise go to step (i); and (i) determining whether to make another iteration to improve confidence and, if so, returning to step (d) to make an additional authentication iteration, otherwise issuing a pass decision, wherein the prover and verifier are electronic devices.

28. A method according to claim 27, wherein said step (i) of determining whether to make another iteration to improve confidence continues iterations until a count of the iterations reaches a number sufficient to achieve a confidence level desired by the verifier.

* * * * *